(12) United States Patent
Stingl

(10) Patent No.: US 6,795,476 B1
(45) Date of Patent: Sep. 21, 2004

(54) FOCUSING DEVICE

(75) Inventor: Andreas Stingl, Korneuburg (AT)

(73) Assignee: Femtolasers Produktions GmbH (AT)

( * ) Notice: Subject to any disclaimer, the term of this patent is extended or adjusted under 35 U.S.C. 154(b) by 0 days.

(21) Appl. No.: 09/979,691

(22) PCT Filed: May 11, 2000

(86) PCT No.: PCT/AT00/00131
§ 371 (c)(1),
(2), (4) Date: Nov. 16, 2001

(87) PCT Pub. No.: WO00/70383
PCT Pub. Date: Nov. 23, 2000

(30) Foreign Application Priority Data

May 18, 1999  (AU) ............................................ A 885/99

(51) Int. Cl.$^7$ ............................................... H01S 3/08
(52) U.S. Cl. ........................... 372/92; 372/107; 372/22; 372/93
(58) Field of Search ........................... 372/92, 107, 22, 372/50, 93

(56) References Cited

U.S. PATENT DOCUMENTS

| | | | |
|---|---|---|---|
| 1,830,308 A | * | 11/1931 | Zepke |
| 4,309,998 A | * | 1/1982 | Aron nee Rosa et al. ...... 606/3 |
| 4,661,958 A | * | 4/1987 | Bowes et al. ................. 372/34 |
| 4,674,097 A | | 6/1987 | Fountain |
| 4,922,501 A | | 5/1990 | Wolgast |
| 4,925,287 A | * | 5/1990 | Lord et al. ................... 359/872 |
| 4,930,493 A | * | 6/1990 | Sallis .......................... 126/438 |
| 5,253,189 A | * | 10/1993 | Kramer ......................... 703/7 |
| 6,298,076 B1 | * | 10/2001 | Caprara et al. ............... 372/43 |
| 6,414,752 B1 | * | 7/2002 | Sullivan et al. .......... 356/237.5 |

FOREIGN PATENT DOCUMENTS

DE          3814829        12/1988

* cited by examiner

*Primary Examiner*—Don Wong
*Assistant Examiner*—Dung Nguyen
(74) *Attorney, Agent, or Firm*—Ostrolenk, Faber, Gerb & Soffen LLP (57) ABSTRACT

A focussing arrangement, in particular for laser devices (1), comprising a focussing mirror (M1) arranged on a carrier which is displaceable in one plane, and having a spherical reflecting surface (43), wherein the displaceable carrier is formed by a rocking member (10) which is at least approximately Z-shaped when seen in top view, the rocking member having a rocking longitudinal arm (27) which is articulately connected on both ends to transverse arms (25, 26), the longitudinal arm carrying the focussing mirror (M1), wherein the transverse arms (25, 26) are arranged so as to be pivotable about pivot axes perpendicular to the plane of displacement, and wherein the center of curvature (M) of the spherical reflecting surface (43) of the focussing mirror (M1) lies at least substantially on an axis extending through the geometric center of the longitudinal arm (27), perpendicular to the plane of displacement.

15 Claims, 5 Drawing Sheets

FOCUSING DEVICE

The invention relates to a focussing arrangement, in particular for laser devices, comprising a focussing mirror arranged on a carrier which is displaceable in one plane, the focussing mirror having a spherical reflecting surface.

Such focussing arrangements frequently are used in laser devices, a precise adjustment of the respective focussing mirror being necessary for an exact focus adjustment. In conventional focussing arrangements, displacement tables (translation or measuring tables) comprising slide or roller bearings are used as carriers for the focussing mirror; the expenditures for these constructions are extremely high, and a bearing clearance which is always present causes a reduced rigidity of the element.

Thus, it is an object of the invention to provide a focussing arrangement of the initially defined type, which derives benefit from a simple and stable structure and which can be produced in a simple manner.

The inventive focussing arrangement of the initially defined type is characterized in that the displaceable carrier is formed by a rocking member which is at least approximately Z-shaped when seen in top view, the rocking member having a rocking longitudinal arm which is articulately connected on both ends with transverse arms, the longitudinal arm carrying the focussing mirror, in that the transverse arms are arranged so as to be pivotable about pivot axes perpendicular to the plane of displacement, and in that the center of curvature of the spherical reflecting surface of the focussing mirror lies at least substantially on an axis extending through the geometric center of the longitudinal arm, perpendicular to the plane of displacement.

In the present focussing device, thus, a Z-shaped rocking member is provided which is dimensioned and arranged such that—when seen in top view—the center of the rocking longitudinal arm coincides with the center of the circle described by the spherical reflecting surface of the focussing mirror. In case of a translatory displacement of the Z-shaped rocking member, the latter is also rotated about the axis extending through its geometric center, resulting in a corresponding rotation of the focussing mirror. This rotation of the focussing mirror, however, occurs about its center of curvature, i.e. the focussing mirror is "rotated along its reflecting surface", and thus, such rotation will not cause a deflection of the focussed beam. The focussed beam therefore continues to extend along a given straight line, and merely the focal point is displaced along this straight line. Preferably, the center of curvature of the reflecting surface of the focussing mirror lies on the median between the incident beam and the line along which the focus of the focussing mirror is shifted during the displacement.

The focussing arrangement according to the invention may advantageously be used with laser devices, in particular with laser resonators, e.g. with laser devices of the type described in WO 98/10494 A. In particular, the invention may also be used in astigmatism-compensating laser resonators, such as described in Herwig W. Kogelnik, Erich P. Ippen, Andrew Dienes, Charles Shank, "Astigmatically Compensated Cavities for CW Dye Lasers", Journal of Quantum Electronics, QE-8, No. 3, March 1972, pp. 373-379; in such a laser resonator arrangement, the laser medium, i.e. a laser crystal, in particular a Ti:S (titanium-sapphire) laser crystal, is arranged in the form of a plane-parallel plate, under a Brewster angle relative to the laser beam, and the laser beam is focussed in the laser medium by aid of focussing mirrors. However, by focussing into the laser medium arranged under a Brewster angle, an astigmatism is introduced, and the latter is compensated by tilting of the focussing mirrors.

Basically, however, the present focussing arrangement can be used quite generally in any arrangements where a light beam, or laser beam, respectively, is to be focussed by aid of a concave mirror, and where the focal point must be precisely adjusted.

For the configuration of the carrier and its bearing, e.g. a mode of construction comprising a block (as longitudinal arm of the rocking member) and with flat steel springs (as "articulated" transverse arms) would be conceivable. Also conceivable are embodiments according to which rigid transverse arms are articulately connected to the longitudinal arm, and are pivotably mounted at their ends facing away from the longitudinal arm. With a view to a simple production, it is advantageous if the ends of the transverse arms of the Z-shaped rocking member which face away from the longitudinal arm are connected to a base carrier via thin material regions in the manner of an integral hinge. In this case, the base carrier preferably has a plate-shaped configuration.

Likewise, it is suitable if the transverse arms of the Z-shaped rocking member are connected to the longitudinal arm via thin material regions in the manner of an integral hinge.

In the present focussing arrangement, thus, preferably it is referred to a technique, already known per se, using carriers mounted via elastically deformable bearing elements, as it has been described under the term "Flexure Arrangement" in a catalogue by Melles Griot, p. 368/369. In the known arrangements, the carriers are adjusted by elastically deforming their bearing parts, yet this results in a parallel offset undesirable for the present applications. To avoid such a parallel offset, a structure called "Compound Flexure Arrangement" has been suggested which, however, is very complicated. As compared to this arrangement comprising a flexible multiple mounting, the present Z-shaped rocking member is substantially simpler in its production and, moreover, also more stable in operation.

With a view to the mass production sought, it has furthermore proven suitable if the Z-shaped rocking member is worked from the plate-shaped base carrier by providing openings while leaving the thin material regions. Production may start from a thicker starting plate (having a thickness of approximately 20 mm, e.g.), in which the respective grooves for the openings are worked in, e.g. milled, over part of the thickness of the plate (e.g., approximately 15 mm). Subsequently, the residual thickness (e.g. approximately 5 mm) may be removed by grinding so that the plate forming the base carrier including the Z-shaped rocking member will remain, having a thickness of approximately 15 mm. For working in the grooves, or openings, respectively, of course also other procedures, such as spark erosion or water torch cutting, may be used.

The thin material regions or material webs forming the integral hinges preferably have a thickness of from approximately 0.3 mm to 0.5 mm, in particular approximately 0.4 mm. With such dimensions, the desired elastic movability of the Z-shaped rocking member is ensured without breaking of the thin material regions. Surprisingly, it has been shown that thicker material webs will break more easily than such thin material regions having a thickness in the order of a few tenths of millimeters.

With a view to the required elastic deformability, on the one hand, and the desired stability, on the other hand, it is also suitable if the plate-shaped base carrier and the Z-shaped rocking member are made of aluminum or of an AlMg alloy.

To provide more conveniently space for accommodating other components of the focussing arrangement, in particular that component which is to-be focussed, externally of the Z-shaped rocking member, it is also If suitable if the longitudinal arm of the Z-shaped rocking member has a cranked shape, seen in top view.

As has already been mentioned, the present invention is advantageously used in laser devices, and accordingly, a particularly advantageous application is given in that a laser medium, e.g. a laser crystal, is arranged in the focus of the focussing mirror, externally of the Z-shaped rocking member. In this instance, the Z-shaped rocking member may carry one of the focussing mirrors of a laser resonator.

In the following, the invention will be explained in more detail by way of the particularly preferred exemplary embodiments illustrated in the drawings to which, however, it shall not be restricted.

Figure 1:
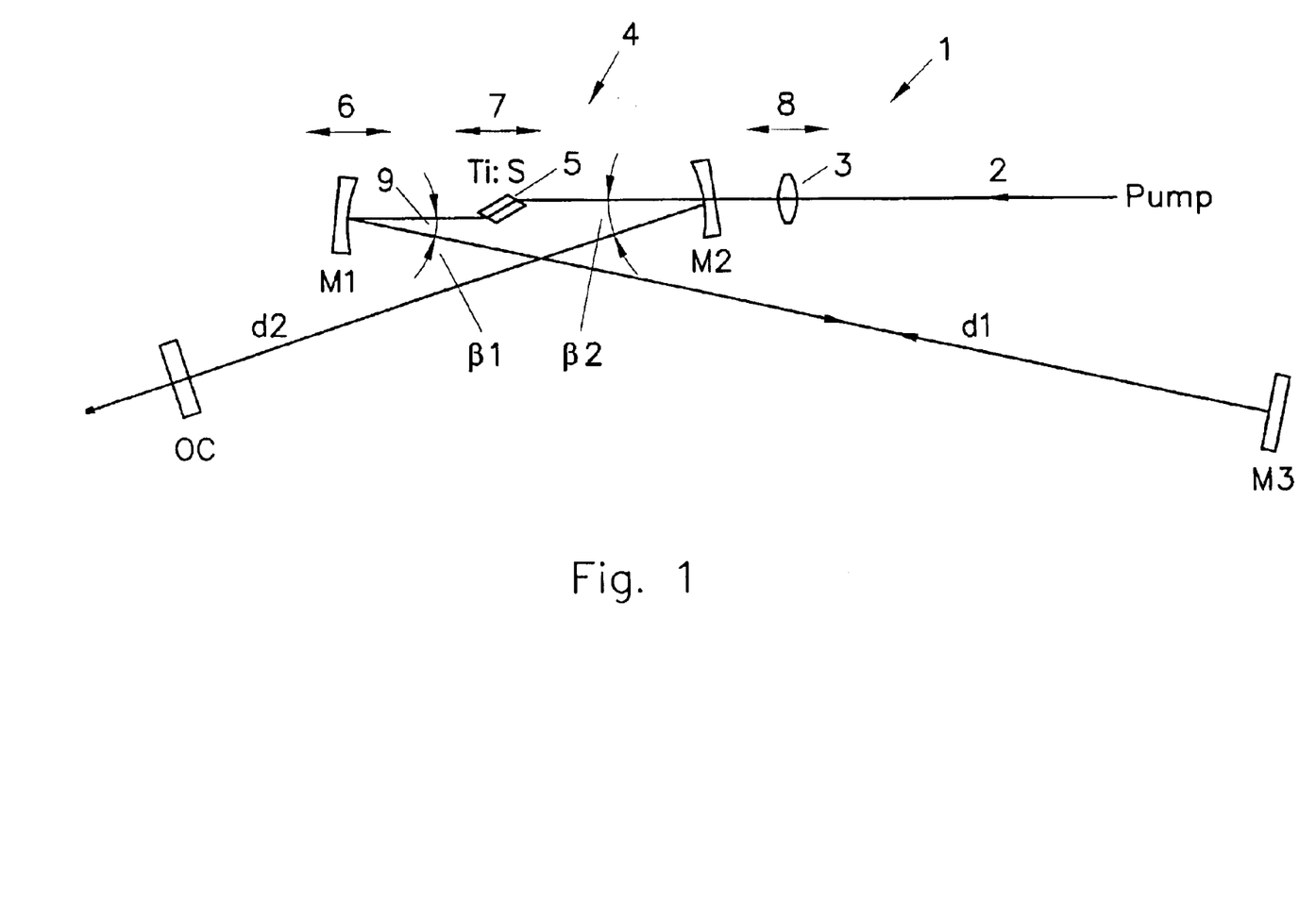
FIG. 1 shows a schematic representation of a so-called X-folded four-mirror laser resonator.

In FIG. 1, a laser device 1 is schematically illustrated, in which a pump beam 2 is supplied to an X-folded laser resonator 4 via a lens 3. The term "X-folded" comes from the fact that two laser beam arms d1, d2 directed to end mirrors M3 and OC, respectively, cross each other, thus forming an "X".

The laser resonator 4 moreover is configured with two laser mirrors M1, M2 between which a Ti:S (titanium sapphire) crystal 5 is arranged as the laser medium. This is a plane-parallel body, a parallelepiped which, e.g., is optically non-linear and forms a Kerr element. This laser crystal 5 is arranged under the so-called Brewster angle so as to minimize losses, and the laser beam is focussed into this laser crystal 5. By this focussing into the laser crystal 5 which is arranged under the Brewster angle, an astigmatism is introduced which may, however, be compensated by tilting the focussing mirrors M1, M2, cf. angles β1 and β2 in FIG. 1.

One of the two focussing mirrors, M2, is fixed, whereas the other mirror, M1, is precisely adjusted so as to adjust the focussing point in the laser crystal 5, as is illustrated by the double arrow at 6 in FIG. 1. Besides, also the laser crystal 5 as well as the lens 3 may be linearly displaced in the course of mounting, as indicated by further double arrows 7, 8 in FIG. 1; these displacements will be explained in more detail by way of FIGS. 3 to 5.

Figure 2:
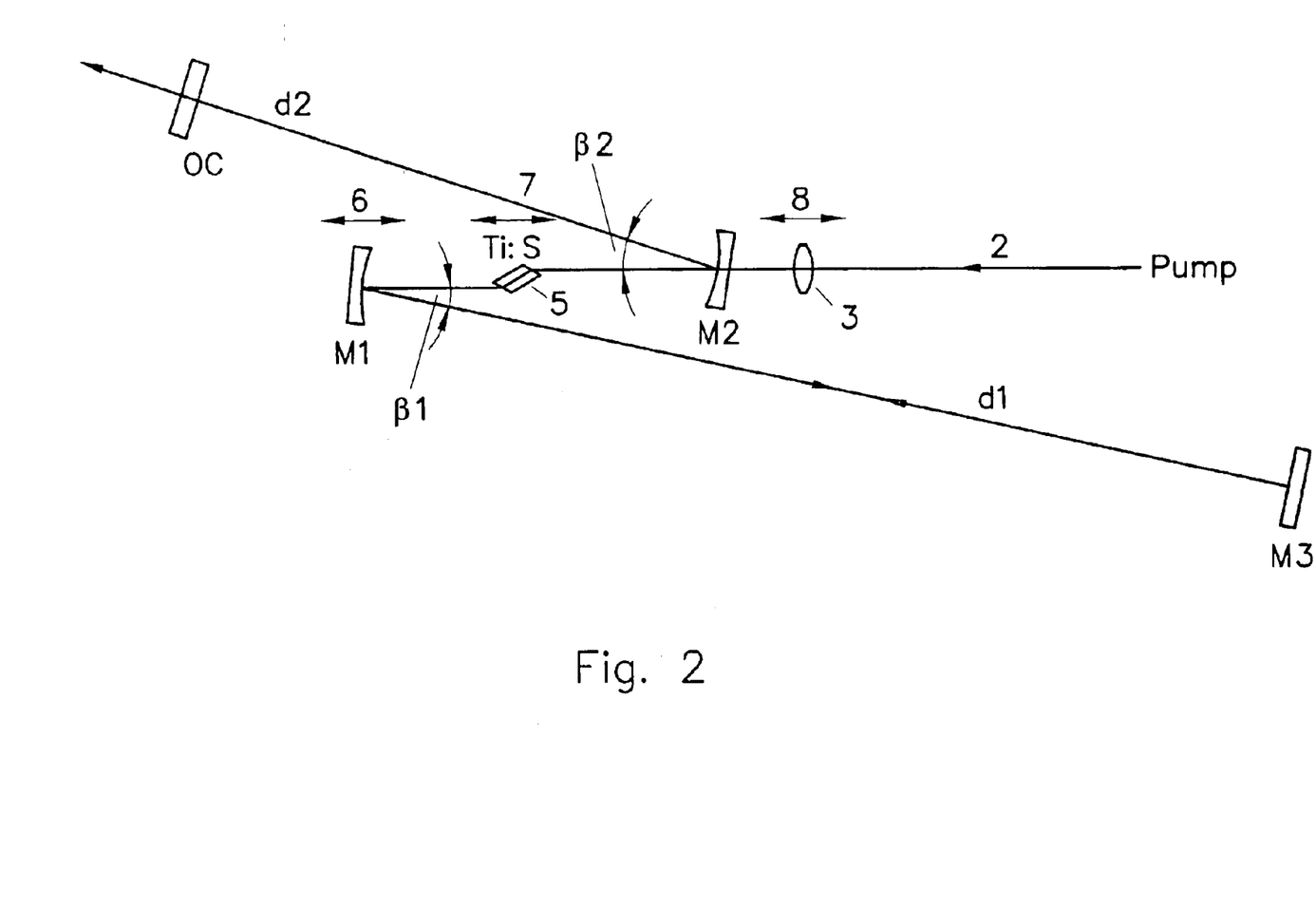
FIG. 2 shows a comparable schematic representation of a so-called Z-folded four-mirror laser resonator.

In FIG. 2, a Z-folded four mirror laser resonator is similarly schematically illustrated, in which a laser beam arm d2 is deflected upwardly and a laser beam arm d1 is deflected downwardly; these two arms d1, d2 form a "Z" with the connection between the two laser mirrors M1, M2.

Besides, the structural elements of the laser device according to FIG. 2 correspond to those of FIG. 1, and also the same reference numbers have been used so that no further explanation is required.

The laser resonators 4 explained by way of FIGS. 1 and 2 are to be understood as examples for the use of the above-mentioned focussing arrangement, and the present focussing arrangement may also be used, e.g., in three mirror resonators or also in multiple mirror resonators (having more than four mirrors) just as quite generally when adjusting spherical concave mirrors used for focussing.

To allow for a precise adjustment of the focal point of the focussing mirror M1 in the laser crystal 5, and to find the stability regions of the laser resonator 4 for a stable laser activity, respectively, a displacement of the focussing mirror M1 must be achieved in which the path of the laser beam between this focussing mirror M1 and the laser crystal 5 is not displaced locally. This path of the laser beam is given at 9 in FIGS. 1 and 2. To maintain this beam orientation, complex displacement tables have been used in the past as carriers for the focussing mirror M1. There-instead, as is apparent from FIGS. 3 to 5, a rocking member 10 substantially Z-shaped in top view is used now, which is arranged and dimensioned in a certain way to be described in more detail below, so as to maintain the given orientation of beam 9 despite a rotation during a displacement in the longitudinal direction and to thus merely displace the focal point F (cf. FIG. 5) by displacing the-focussing mirror M1.

The Z-shaped rocking member 10 is worked out from a plate-shaped base carrier 11 which serves to mount the entire laser device, e.g. according to FIG. 1. Accordingly, in FIG. 3 the lens 3, the two laser mirrors M2 and M1, the two end mirrors M3 and OC as well as the laser crystal 5 are shown to be mounted on the base carrier 11. In this manner, the X-fold four-mirror laser resonator 4 explained before by way of FIG. 1 is formed.

Figure 3:
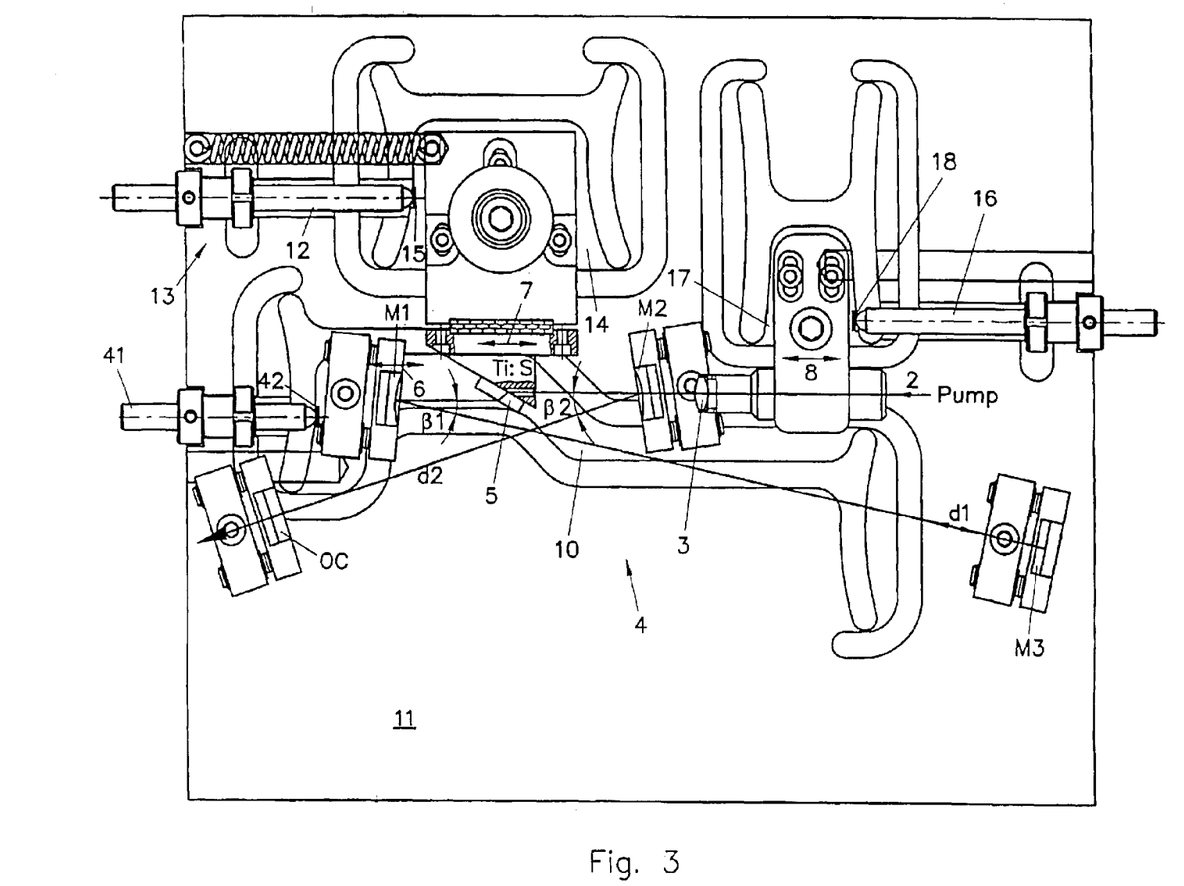
FIG. 3 shows a top view on a plate-shaped base carrier comprising the components of an X-folded laser resonator according to FIG. 1, wherein one of the focussing mirrors is mounted on a rocking member integrated in the base carrier and movably mounted therein and Z-shaped in top view.

To displace the support with the laser crystal 5 according to the double arrow 7, an adjustment spindle 12 is provided which is supported in a fixed bearing 13 on the base plate 11 and engages a parallel-displaceable carrying element 14 worked out from the base carrier 11 in a similar manner as -the Z-shaped rocking member 10 and generally U-shaped when seen in top view, as is schematically illustrated at 15 in FIG. 3. Similarly, an adjustment spindle 16 engages at a carrying element 17 for the lens 3 at 18 to thus allow for a parallel displacement according to the double arrow 8.

Figure 4:
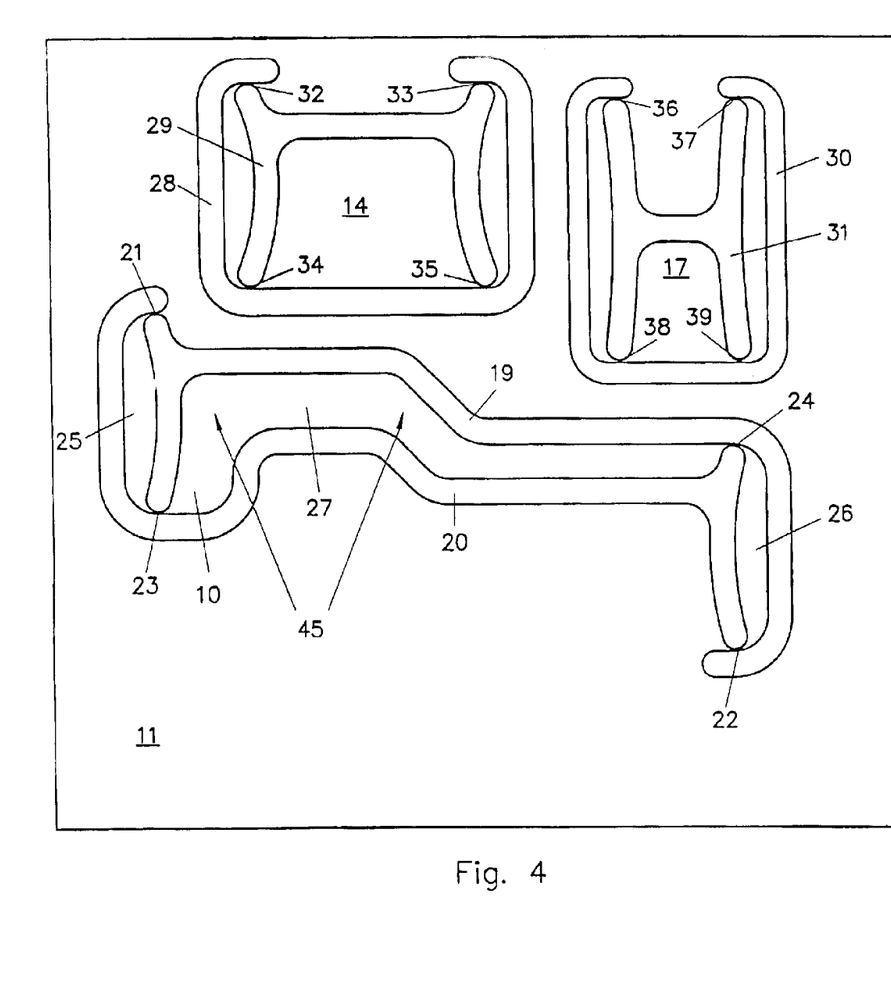
FIG. 4 is a top view onto the base plate of FIG. 3, comprising i.a. the Z-shaped rocking member, yet without the components of the laser device.

As regards their design and arrangement, the two carrying elements 14, 17, just like the Z-shaped rocking member 10, are more clearly visible from the top view according to FIG. 4.

To obtain the Z-shaped rocking member 10, two slot-shaped openings 19, 20 whose shape is visible in FIG. 4 are provided, thin material regions or webs 21, 22 and 23, 24, respectively, being left between these openings 19, 20 so as to form integral hinges having hinge axes perpendicular to the plane of drawing. The one material regions 21, 22 connect the two outer transverse arms 25, 26 of the Z-shaped rocking member 10 with the remaining plate-shaped base carrier 11, whereas the other material regions 23, 24 each connect one of the transverse arms 25, 26 with the central, rocking longitudinal arm 27 of the Z-shaped rocking member 10.

Similarly, also the carrying elements 14, 17 are defined by slot-shaped openings 28, 29 and 30, 31, respectively, thin material webs being left at 32, 33; 34, 35, and 36, 37; 38, 39, respectively, in a similar manner so as to form integral hinges. In this manner, these carrying elements 14, 17 can be adjusted in the direction of the double arrows 7 and 8, respectively, in FIGS. 1 to 3 by aid of the spindles 12 and 16, respectively, yet a slight offset transversely thereto also occurs which, however, is no problem in case of the present application.

Figure 5:
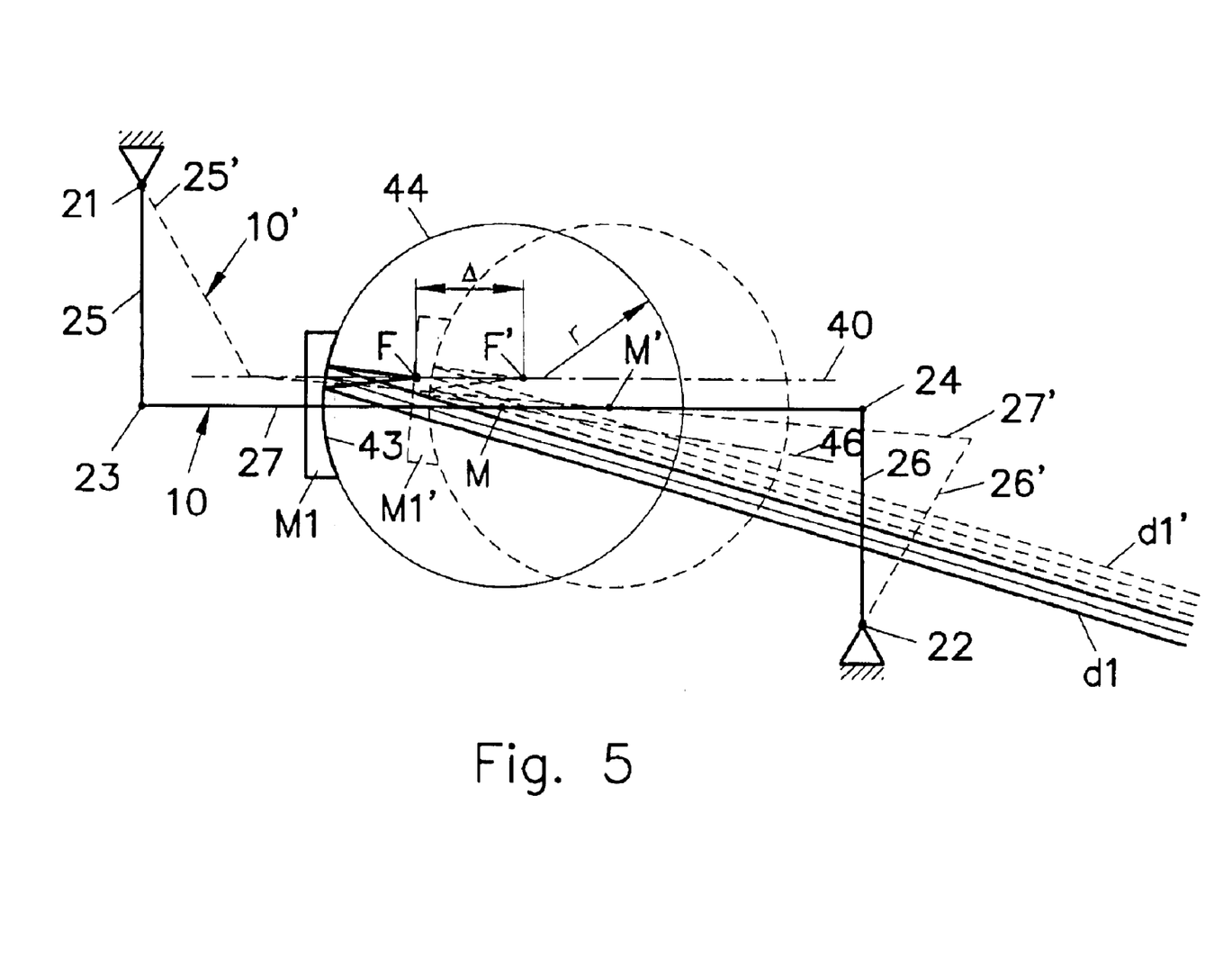
FIG. 5 shows a schematic representation of the Z-shaped rocking member, to illustrate its mode of action when displaced, the displaced position being illustrated in broken lines.

What is important, however, is that the focussing mirror M1 can be displaced by aid of the Z-shaped rocking member 10 in a manner such that its focal point F, or F', respectively, will be displaced during a displacement e.g. of the amount Δ, cf. FIG. 5, on one and the same line 40 illustrated in dot-and-dash lines in FIG. 5. In FIG. 5, the starting position of the Z-shaped rocking member 10 merely schematically indicated in straight lines is indicated in solid lines, and the position displaced relative thereto is indicated at 10' in broken lines.

For an adjustment, an adjustment spindle 41 is appropriately mounted on the base plate 11 which engages a support means for the focussing mirror M1 at 42, cf. FIG. 3.

In FIG. 5, also the circle of curvature 44 associated with the focussing mirror M1 which has a spherical reflecting surface 43 is illustrated, and it is visible that in the top view according to FIG. 5, the center of curvature M of the spherical reflecting surface 43 of the focussing mirror M1, i.e. the center of circle 44, coincides with the center (pivot) of the longitudinal arm 27 of the Z-shaped rocking member 10 (or more precisely, with the axis extending perpendicular to the drawing plane of FIG. 5 through this center); the center M of the circle 44 shall also lie on the median 46 between the incident beam d1 and the line 40, along which the focus F shifts.

The coincidence of the centers M is important since in this manner it is achieved that during a displacement of the Z-shaped rocking member 10, when the longitudinal arm 27 thereof is, e.g., shifted towards the right in the illustration in FIG. 5 and simultaneously is pivoted about its shifting middle axis M, the focussing mirror M1 is entrained in the longitudinal displacement and rotation; since the focussing mirror M1, however, is rotated about the longitudinally displaced center M, this has no detrimental effects on the laser beam to be focussed, cf. d1 and 9, respectively, since due to the spherical design of the reflecting surface 43, the focal point F or F', respectively, will remain on the said line 40 which corresponds to the laser beam path 9 in FIGS. 1 and 2. The construction part which is to be focussed at, i.e. the laser crystal 5 in the present example, is arranged in this focal point F or F', respectively, and it may be seen that the focal point F or F', respectively, corresponding to the displacement Δ can be precisely adjusted to the given site of the laser crystal 5 or that the distance between the laser mirrors M1, M2 can be changed, respectively, so as to adjust the stability regions of the laser.

At this adjustment, the laser beam arm d1 is, as is visible from FIG. 5, somewhat offset parallel to its longitudinal course, cf. d1' in FIG. 5, yet this parallel offset does not matter because the associated end mirror M3 is a plane mirror which merely has to be large enough so as to be able to reflect the laser beam d1 back into itself despite this parallel offset of the laser beam.

With the mode of construction of the laser device particularly visible in FIG. 3, wherein the various construction elements are arranged on the base carrier 11 and the adjustable focussing mirror M1 is arranged on the z-shaped rocking member 10 worked out from this base carrier 11, an extremely compact, stable and robust arrangement is obtained, and this carrier design is also suitable for mass production. The plate-shaped base carrier 11 may be made of aluminum or of an aluminum magnesium alloy, and it may have a thickness of approximately 15 mm. At the production, it is started from an appropriate metal plate having a thickness of, e.g., 20 mm, in which grooves to a depth of approximately 15 mm, corresponding to the various openings 19, 20 as well as 28, 29, 30, 31 are made, in particular milled. Subsequently, the residual thickness of the plate, which will be 5 mm in this case, is removed by grinding so that the base carrier 11 with its openings which pass through its entire thickness will remain. This ensures the movability of the carrying elements 14, 17 or of the Z-shaped rocking member 10, respectively, under elastic deformation of the remaining thin material regions.

Certain deviations from the arrangements and orientations explained above are, of course, admissible, such as, e.g., a slight deviation of the center of curvature M of the reflecting surface 43 from the axis extending through the center of the longitudinal arm 27 of the Z-shaped rocking member 10; moreover, the two transverse arms 25, 26 may differ somewhat from each other in terms of length. The longitudinal arm 27 of the Z-shaped rocking member 10 need not be straight, as illustrated in the schematic representation of FIG. 5, but it may also be cranked, seen in top view, as is apparent at 45 in FIG. 4. In this manner, it is easier to arrange the laser crystal 5 in the path of the focussed laser beam 9 between the focussing mirrors M1 and M2.

What is claimed is:

1. A laser focussing arrangement comprising a focussing mirror (M1) with a curved surface arranged on a carrier which is displaceable in one plane, and having a spherical reflecting surface, characterized in that the displaceable carrier is formed by a rocking member (10) which is at least approximately z-shaped when seen in top view, the rocking member having a rocking longitudinal arm (27) which is articulately connected on both ends to transverse arms (25, 26), the longitudinal arm carrying the focussing mirror (M1), in that the transverse arms (25, 26) are arranged so as to be pivotable about pivot axes perpendicular to the plane of displacement, and in that the center of curvature (M) of the spherical reflecting surface (43) of the focussing mirror (M1) lies at least substantially on an axis extending through the geometric center of the longitudinal arm (27), perpendicular to the plane of displacement.

2. A laser focussing arrangement according to claim 1, characterized in that the center of curvature (M) of the reflecting surface (43) of the focussing mirror (M1) lies on the median (46) between the incident beam (d1) and the line (40), along which the focus (F) of the focussing mirror (M1) is shifted during the displacement.

3. A laser focussing arrangement according to claim 1, characterized in that the ends of the transverse arms (25, 26) of the Z-shaped rocking member (10) are connected to a base carrier (11) via thin material regions (21, 22) in the manner of an integral hinge.

4. A laser focussing arrangement according to claim 3, characterized in that the base carrier (11) has a plate-shaped configuration.

5. A laser focussing arrangement according to claim 1, characterized in that the transverse arms (25, 26) of the Z-shaped rocking member (10) are connected to the longitudinal arm (27) via thin material regions (23, 24) in the manner of an integral hinge.

6. A laser focussing arrangement according to claim 4, characterized in that the Z-shaped rocking member (10) is worked from the plate-shaped base carrier (11) by providing openings (19, 20) while leaving the thin material regions (21, 22, 23, 24).

7. A laser focussing arrangement according to claim 4, characterized in that the plate-shaped base carrier (11) as well as the Z-shaped rocking member (10) have a thickness of approximately 15 mm.

8. A laser focussing arrangement according to claim 3, characterized in that the thin material regions (21, 22, 23, 24) have a thickness of from approximately 0.3 mm to 0.5 mm.

9. A laser focussing arrangement according to claim 3, characterized in that the thin material regions (21, 22, 23, 24) have a thickness of approximately 0.4 mm.

10. A laser focussing arrangement according to claim 6, characterized in that the plate-shaped base carrier (11) and the Z-shaped rocking member (10) are made of aluminum.

11. A laser focussing arrangement according to claim 6, characterized in that the plate-shaped base carrier (11) and the Z-shaped rocking member (10) are made of an AlMg alloy.

12. A laser focussing arrangement according to claim 1, characterized in that the longitudinal arm (27) of the Z-shaped rocking member (10) has a cranked shape, seen in top view.

13. A laser focussing arrangement according to claim 1, characterized in that a laser medium is arranged in the focus (F) of the focussing mirror (M1), externally of the Z-shaped rocking member (10).

14. A laser focussing arrangement according to claim 13, characterized in that the z-shaped rocking member (10) carries one of the focussing mirrors (M1) of a laser resonator (4).

15. A laser focussing arrangement according to claim 13, characterized in that the laser medium is a laser crystal(s).

\* \* \* \* \*

UNITED STATES PATENT AND TRADEMARK OFFICE
CERTIFICATE OF CORRECTION

PATENT NO. : 6,795,476 B1
DATED : September 21, 2004
INVENTOR(S) : Stingl It is certified that error appears in the above-identified patent and that said Letters Patent is hereby corrected as shown below:

Title page,
Item [30], Foreign Application Priority Data, add -- May 18, 1999 (AT) …………….. A 885/99 --.

Signed and Sealed this

Twenty-second Day of March, 2005

JON W. DUDAS
*Director of the United States Patent and Trademark Office*